United States Patent
Susca et al.

(10) Patent No.: US 12,286,967 B2
(45) Date of Patent: Apr. 29, 2025

(54) HIGH TURN DOWN RATIO DIRECT CONTROL FOR VARIABLE DISPLACEMENT PUMPS

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/096,932

(22) Filed: Jan. 13, 2023

(65) Prior Publication Data

US 2024/0240630 A1    Jul. 18, 2024

(51) Int. Cl.
*F04B 49/08*    (2006.01)
*F04B 49/24*    (2006.01)
*F04B 53/10*    (2006.01)

(52) U.S. Cl.
CPC .............. *F04B 49/08* (2013.01); *F04B 49/24* (2013.01); *F04B 53/10* (2013.01); *F04B 2201/06* (2013.01); *F04B 2205/05* (2013.01)

(58) Field of Classification Search
CPC .......... F04B 49/08; F04B 49/24; F04B 49/22; F04B 2205/05
See application file for complete search history.

(56) References Cited

U.S. PATENT DOCUMENTS

| | | | | |
|---|---|---|---|---|
| 5,017,099 | A | * | 5/1991 | Tan .......... F04B 49/08 60/415 |
| 5,806,300 | A | * | 9/1998 | Veilleux, Jr. .......... F02M 37/04 60/734 |
| 6,065,451 | A | * | 5/2000 | Lebrun .......... F02C 9/38 251/65 |
| 6,102,001 | A | | 8/2000 | McLevige |
| 6,162,022 | A | * | 12/2000 | Anderson .......... F02M 57/025 417/213 |

(Continued)

FOREIGN PATENT DOCUMENTS

EP    4296492 A1    12/2023

OTHER PUBLICATIONS

Extended European Search Report for EP Application No. 24151443.9, Dated Jun. 17, 2024, pp. 6.

(Continued)

*Primary Examiner* — Christopher S Bobish
(74) *Attorney, Agent, or Firm* — Kinney & Lange, P.A.

(57) ABSTRACT

A system includes a variable displacement pump (VDP) in fluid communication with an inlet line and with an outlet line. The VDP includes a variable displacement mechanism configured to vary pressure to the outlet line. A bypass valve (BPV) includes a BPV inlet in fluid communication with the outlet line, and a BPV outlet in fluid communication with a bypass line that feeds into the inlet line upstream of the VDP. An actuator is operatively connected to control the BPV to vary flow from the BPV inlet to the bypass line. A controller is operatively connected to the actuator to control recirculation flow passed through the BPV based on requested flow from a downstream system supplied by the outlet line and based on a predetermined low threshold of flow through the VDP.

16 Claims, 1 Drawing Sheet

(56) References Cited

U.S. PATENT DOCUMENTS

| | | | |
|---|---|---|---|
| 6,192,681 B1 * | 2/2001 | Tsuruga | E02F 9/2296 60/447 |
| 6,216,456 B1 * | 4/2001 | Mitchell | F15B 21/08 417/213 |
| 6,487,847 B1 | 12/2002 | Snow et al. | |
| 6,494,182 B1 * | 12/2002 | Djordjevic | F04B 49/24 123/456 |
| 6,584,762 B2 | 7/2003 | Snow et al. | |
| 6,694,950 B2 * | 2/2004 | Djordjevic | F02M 59/205 123/456 |
| 8,128,368 B2 | 3/2012 | Bielefedt | |
| 8,128,378 B2 | 3/2012 | Rowan et al. | |
| 8,162,619 B2 * | 4/2012 | Laskaris | F02D 29/04 137/492.5 |
| 8,166,765 B2 | 5/2012 | Baker et al. | |
| 8,172,551 B2 | 5/2012 | Baker | |
| 8,192,172 B2 | 6/2012 | Baker et al. | |
| 8,302,406 B2 | 11/2012 | Baker | |
| 8,869,509 B2 | 10/2014 | Baker | |
| 9,574,500 B2 | 2/2017 | Kelly et al. | |
| 9,617,923 B2 | 4/2017 | Griffiths | |
| 9,850,917 B2 | 12/2017 | Mueller et al. | |
| 9,982,417 B1 | 5/2018 | Humble | |
| 10,655,622 B2 * | 5/2020 | McBrien | F04B 49/24 |
| 10,788,025 B2 * | 9/2020 | Ishikura | F04B 1/06 |
| 10,822,772 B1 * | 11/2020 | Wright | E02F 9/2232 |
| 10,890,117 B2 * | 1/2021 | Chalaud | F02C 9/46 |
| 2004/0040595 A1 | 3/2004 | Youngpeter et al. | |
| 2004/0200459 A1 | 10/2004 | Bennett et al. | |
| 2005/0100447 A1 | 5/2005 | Desai et al. | |
| 2008/0289338 A1 | 11/2008 | Desai | |
| 2010/0037961 A1 | 2/2010 | Tysver et al. | |
| 2012/0090308 A1 * | 4/2012 | Yuan | F15B 21/08 60/413 |
| 2015/0027570 A1 | 1/2015 | Wi et al. | |
| 2015/0167833 A1 | 6/2015 | Jo et al. | |
| 2016/0189988 A1 | 6/2016 | Haga et al. | |
| 2016/0341223 A1 * | 11/2016 | Marsch | F16H 61/423 |
| 2017/0030347 A1 * | 2/2017 | McBrien | G05D 7/0635 |
| 2017/0306856 A1 | 10/2017 | Bickley | |
| 2018/0340501 A1 * | 11/2018 | Ni | F04B 49/08 |
| 2018/0340531 A1 * | 11/2018 | Ni | B64D 37/005 |
| 2018/0372006 A1 | 12/2018 | Chalaud et al. | |
| 2022/0098066 A1 | 3/2022 | Benham et al. | |
| 2022/0307491 A1 | 9/2022 | Rutar | |

OTHER PUBLICATIONS

Extended European Search Report for EP Application No. 24151656.6, Dated Mar. 15, 2024, pp. 9 Pages.
Final Rejection dated Feb. 12, 2025, for corresponding U.S. Appl. No. 18/096,949, 9 pgs.

* cited by examiner

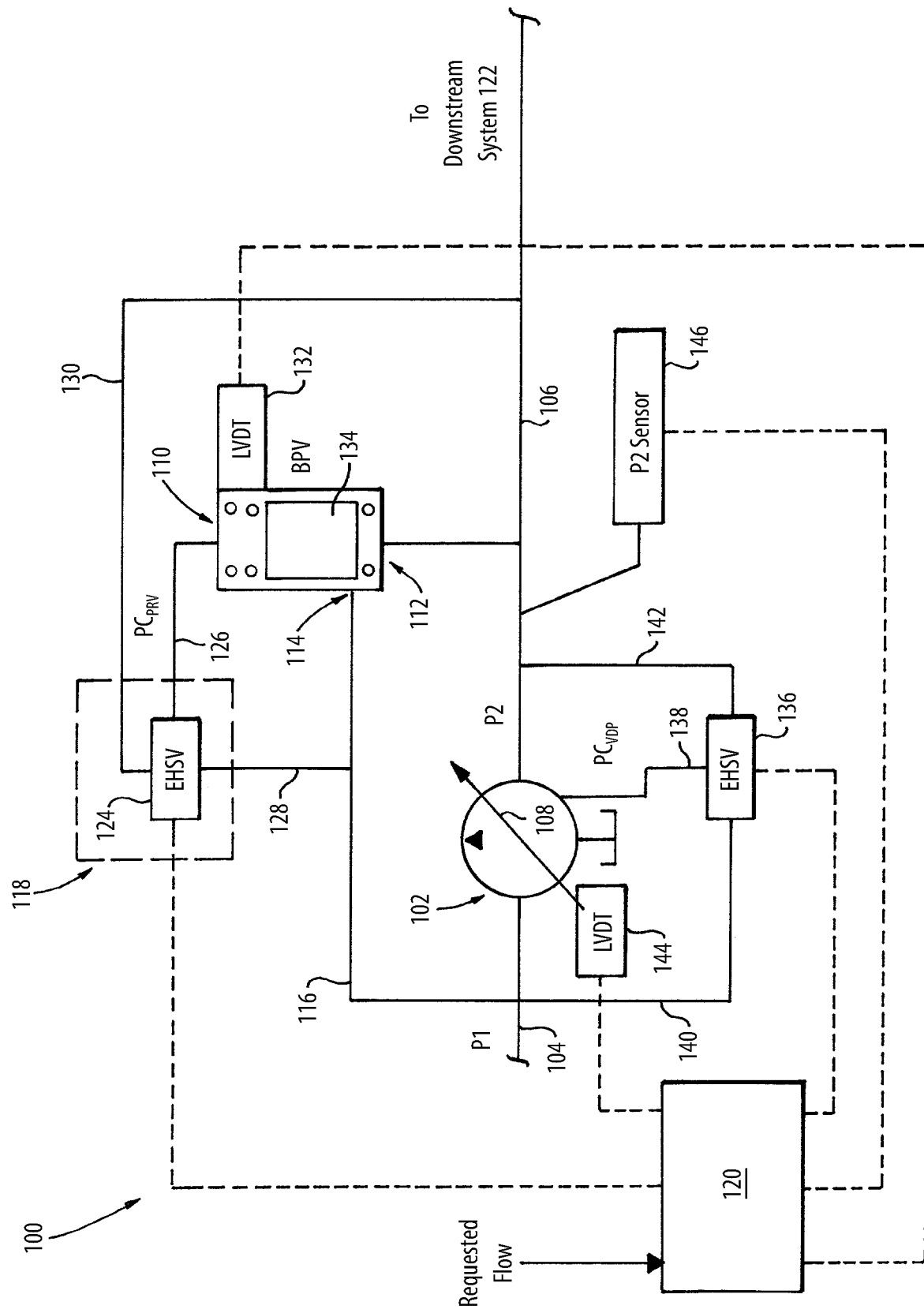

HIGH TURN DOWN RATIO DIRECT CONTROL FOR VARIABLE DISPLACEMENT PUMPS

BACKGROUND

1. Field

The present disclosure relates to pump control, and more particularly to control for variable displacement pumps (VDPs).

2. Description of Related Art

In a pump, the turn-down ratio is the ratio of the pump's maximum flow to its minimum flow. In fuel delivery systems using a variable displacement pump (VDP), often the pump is subject to a high turn-down ratio. This can drive a pump design with a less than optimal pump efficiency throughout the operating range as a tradeoff for ensuring the turn-down ratio needed. For example, it is beneficial to pump design to minimize this turn-down ratio to be less than 4:1. But large displacement VDPs can struggle to function with such high turn down ratios in typical fuel metering systems because minimum pump pressure flows to support cooling the VDP are typically higher than the lowest flow for fuel burners, e.g. in gas turbine engines such as on aircraft.

The conventional techniques have been considered satisfactory for their intended purpose. However, there is an ever present need for improved systems and methods for control of VDPs. This disclosure provides a solution for this need.

SUMMARY

A system includes a variable displacement pump (VDP) in fluid communication with an inlet line and with an outlet line. The VDP includes a variable displacement mechanism configured to vary pressure to the outlet line. A bypass valve (BPV) includes a BPV inlet in fluid communication with the outlet line, and a BPV outlet in fluid communication with a bypass line that feeds into the inlet line upstream of the VDP. An actuator is operatively connected to control the BPV to vary flow from the BPV inlet to the bypass line. A controller is operatively connected to the actuator to control recirculation flow passed through the BPV based on requested flow from a downstream system supplied by the outlet line and based on a predetermined low threshold of flow through the VDP. The BPV outlet can be the only outlet of the BPV so all flow through the BPV is supplied to the BPV outlet.

The controller can be configured to control the BPV to maintain a baseline flow through the BPV under a first condition wherein requested flow from the downstream system is above than the predetermined low threshold. The controller can be configured to control the BPV to increase the flow through the BPV above the baseline flow for a second flow condition wherein requested flow from the downstream system is at or below the predetermined low threshold.

A first electrohydraulic servo valve (EHSV) can be connected in fluid communication with the BPV by a first control line. The first EHSV can be connected in fluid communication with both the inlet line and with the outlet line through respective connection lines. The first EHSV can be operatively connected to the controller for active control of the first EHSV to actuate the BPV.

A first position sensor can be operatively connected to the BPV to provide sensor output indicative of position of a valve member of the BPV. The first position sensor can be operatively connect the controller to provide feedback for controlling the BPV. A second EHSV can be connected in fluid communication with the variable displacement mechanism by a second control line for control of flow through the VDP. The second EHSV can be connected in fluid communication with both the inlet line and with the outlet line through respective connection lines. The second EHSV can be operatively connected to the controller for active control of the second EHSV to actuate the variable displacement mechanism. A second position sensor can be operatively connected to the variable displacement mechanism to provide sensor output indicative of position of the variable displacement mechanism, wherein the second position sensor is operatively connect the controller to provide feedback for controlling the variable displacement mechanism.

A pressure sensor can be operatively connected to the outlet line to generate sensor output indicative of pressure in the outlet line. The pressure sensor can be operatively connected to the controller for active control of the variable displacement mechanism and/or of the BPV based on pressure in the outlet line. The controller can be operatively connected to receive input indicative of flow demanded by the downstream system supplied by the outlet line. The controller can be configured to control position of the valve member of the BPV to maintain bypass flow through the BPV in the second condition wherein the controller governs the bypass flow through the BPV according to $$BF = PF - DSFD$$

wherein BF is flow through the BPV, PF is flow through the VDP, and DSFD is flow demanded by the downstream system supplied by the outlet line.

A method includes receiving input indicative of flow demanded by a downstream system supplied from an outlet line of a variable displacement pump (VDP). The method includes controlling a bypass valve (BPV) to recirculate flow from the outlet line to an input line of the VDP in the event of flow demanded by the downstream system dropping below a predetermined low threshold of flow through the VDP.

The method can include controlling the BPV to recirculate flow from the outlet line to the inlet line at a constant base recirculation rate in the event of flow demanded by the downstream system being at or above the predetermined low threshold of flow through the VDP. The base recirculation rate can be zero recirculation flow. The method can include receiving sensor data from a pressure sensor in the outlet line. Controlling the BPV to recirculate flow can include controlling the BPV based at least in part on the sensor data. Controlling the BPV to recirculate flow can include governing the bypass flow through the BPV according to $$BF = PF - DSFD$$

wherein BF is flow through the BPV, PF is flow through the VDP, and DSFD is flow demanded by the downstream system supplied by the outlet line. The method can include receiving data from a sensor indicative of position of a valve member of the BPV. Controlling the BPV can include controlling the BPV based on position of the valve member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an embodiment of a system constructed in accordance with the present disclosure, showing the connections of the variable displacement pump (VDP) and a bypass valve (BPV).

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to provide high turn down ratios for variable displacement pumps, and for control of the same, such as for use in supplying fuel to gas generators in aircraft engines.

The system 100 includes a variable displacement pump (VDP) 102 in fluid communication with an inlet line 104 and with an outlet line 106. The VDP 102 includes a variable displacement mechanism 108 configured to vary pressure to the outlet line 106. A bypass valve (BPV) 110 includes a BPV inlet 112 in fluid communication with the outlet line 106, and a BPV outlet 114 in fluid communication with a bypass line 116 that feeds into the inlet line 104 upstream of the VDP 102. An actuator 118 is operatively connected to control the BPV 110 to vary flow from the BPV inlet 112 to the bypass line 116.

A controller 120 is operatively connected to the actuator 118 to control recirculation flow passed through the BPV 110 based on requested flow from a downstream system 122 supplied by the outlet line 106 and based on a predetermined low threshold of flow through the VDP 104. The downstream system 122 can be a combustor, augmenter, or other gas generator of a gas turbine engine, for example. The low threshold of flow of the VDP 104 can be the threshold below which the VDP 104 cannot self-lubricate, or other design requirements for low or minimum flow. The BPV outlet 114 can be the only outlet of the BPV 110 so all flow through the BPV 110 from the BPV inlet 112 is supplied to the BPV outlet 114.

The controller 120 is configured, e.g. including analog circuitry, digital logic, and/or machine readable instructions, to control the BPV 110 to maintain a baseline flow through the BPV 110 under a first condition wherein requested flow from the downstream system 122 is above the predetermined low threshold. The controller 120 is configured to control the BPV 110 to increase the flow through the BPV 110 above the baseline flow for a second flow condition wherein requested flow from the downstream system 122 is at or below the predetermined low threshold.

The actuator 118 includes a first electrohydraulic servo valve (EHSV) 124 that is connected in fluid communication with the BPV 110 by a first control line 126. The first EHSV 124 is connected in fluid communication with both the inlet line 104, by way of the recirculation line 116, and with the outlet line 106 through respective connection lines 128, 130. The first EHSV 124 is operatively connected to the controller 120 for active control of the first EHSV 124 to actuate the BPV 110.

A first position sensor 132, such as a linear variable differential transformer (LVDT), is operatively connected to the BPV 110 to provide sensor output indicative of position of a valve member 134 of the BPV 110 within the BPV 110. The first position sensor 132 is operatively connected to the controller 120 to provide feedback for controlling the BPV 110. A second EHSV 136 is connected in fluid communication with the variable displacement mechanism 108 by a second control line 138 for control of flow through the VDP 102. The second EHSV 136 is connected in fluid communication with both the inlet line 104 and with the outlet line 106 through respective connection lines 140, 142. The second EHSV 136 is operatively connected to the controller 120 for active control of the second EHSV 136 to actuate the variable displacement mechanism 108 to control flow through the variable displacement mechanism 108. A second position sensor 144, such as an LVDT, is operatively connected to the variable displacement mechanism 108 to provide sensor output indicative of position of the variable displacement mechanism 108, wherein the second position sensor 144 is operatively connect the controller 120 to provide feedback for controlling the variable displacement mechanism 108.

A pressure sensor 146 is operatively connected to the outlet line 106 to generate sensor output indicative of pressure in the outlet line 106. The pressure sensor 146 is operatively connected to the controller 120 for active control of the variable displacement mechanism 108 and/or of the BPV 110 based on pressure in the outlet line 106.

The controller is operatively connected to receive input indicative of flow demanded by the downstream system 122, as indicated by the arrow and label in FIG. 1. The controller 120 is configured to control position of the valve member 134 of the BPV 110 to maintain bypass flow through the BPV in the second condition, i.e. when recirculation through the BPV 110 is needed because flow demanded by the downstream system 122 drops below the predetermined low threshold for flow through the VDP 102. In this second condition, the controller 120 governs the bypass flow through the BPV 110 according to $$BF = PF - DSFD$$

wherein BF is flow through the BPV 110, PF is flow through the VDP 102 (e.g. as indicated by sensors 144 and/or 146), and DSFD is flow demanded by the downstream system 122.

In the first condition, e.g. when flow demanded by the downstream system 122 is at or above the predetermined low threshold for flow through the VDP 112, the controller 120 controls the BPV 110 to recirculate flow from the outlet line 106 to the inlet line 102 at a constant base recirculation rate. The base recirculation rate can be zero recirculation flow.

Systems and methods as disclosed herein provide various potential benefits including the following. There can be a reduction in valve count the need for a metering valve can be eliminated. The metering system can be faster than legacy systems, e.g. where a metering valve controls pressure control valve (PCV) which controls pump displacement or the like.

The methods and systems of the present disclosure, as described above and shown in the drawings, provide for high turn down ratios for variable displacement pumps, and for control of the same, such as for use in supplying fuel to gas generators in aircraft engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a variable displacement pump (VDP) in fluid communication with an inlet line and with an outlet line, wherein the VDP includes a variable displacement mechanism configured to vary pressure to the outlet line;
a bypass valve (BPV) including:
   a BPV inlet in fluid communication with the outlet line; and
   a BPV outlet in fluid communication with a bypass line that feeds into the inlet line upstream of the VDP;
an actuator operatively connected to control the BPV to vary flow from the BPV inlet to the bypass line; and
a controller operatively connected to the actuator to control recirculation flow passed through the BPV based on requested flow from a downstream system supplied by the outlet line and based on a predetermined low threshold of flow through the VDP, wherein:
   the actuator comprises a first electrohydraulic servo valve (EHSV) connected in fluid communication with the BPV by a first control line;
   the first EHSV is connected in fluid communication with both the inlet line through a first connection line and with the outlet line through a second connection line;
   the first EHSV is operatively connected to the controller for active control of the first EHSV and to thereby actuate the BPV;
   the system further comprises a second EHSV connected in fluid communication with the variable displacement mechanism by a second control line for control of flow through the VDP;
   the second EHSV is connected in fluid communication with the both the inlet line through a third connection line and the outlet line through a fourth connection line; and
   the second EHSV is operatively connected to the controller for active control of the second EHSV and to thereby actuate the variable displacement mechanism.

2. The system as recited in claim 1, wherein the BPV includes no outlets other than the BPV outlet so all flow through the BPV is supplied to the BPV outlet.

3. The system as recited in claim 1, wherein the controller is configured to:
control the BPV to maintain a baseline flow through the BPV under a first flow condition wherein requested flow from the downstream system is above the predetermined low threshold; and
control the BPV to increase the flow through the BPV above the baseline flow for a second flow condition wherein requested flow from the downstream system is at or below the predetermined low threshold.

4. The system as recited in claim 3, wherein a first position sensor is operatively connected to the BPV to provide sensor output indicative of position of a valve member of the BPV, wherein the first position sensor is operatively connected to the controller to provide feedback for controlling the BPV.

5. The system as recited in claim 4, wherein a second position sensor is operatively connected to the variable displacement mechanism to provide sensor output indicative of position of the variable displacement mechanism, wherein the second position sensor is operatively connected to the controller to provide feedback for controlling the variable displacement mechanism.

6. The system as recited in claim 5, further comprising a pressure sensor operatively connected to the outlet line to generate sensor output indicative of pressure in the outlet line, wherein the pressure sensor is operatively connected to the controller for active control of the variable displacement mechanism and/or of the BPV based on pressure in the outlet line.

7. The system as recited in claim 6, wherein the controller is operatively connected to receive input indicative of flow demanded by the downstream system supplied by the outlet line, and wherein the controller is configured to control position of the valve member of the BPV to maintain bypass flow through the BPV in a second condition wherein the controller governs the bypass flow through the BPV according to $$BF=PF-DSFD$$

wherein BF is flow through the BPV, PF is flow through the VDP, and DSFD is the flow demanded by the downstream system supplied by the outlet line.

8. A method for operating a system comprising a bypass valve (BPV), a controller, and a variable displacement pump (VDP), the method comprising:
measuring:
   a valve member position of a valve member of the BPV using a first position sensor and thereby obtaining a measured valve member position;
   a variable displacement mechanism (VDM) position of a VDM of the VDP using a second position sensor and thereby obtaining a measured VDM position; and
   an input indicative of flow demanded by a downstream system supplied by an outlet line of the VDP;
receiving the input indicative of flow demanded, the measured valve member position, and the measured variable displacement mechanism position into the controller;
directing a first electrohydraulic servo valve (EHSV), using the controller, to change the valve member position and thereby actuate the BPV according to the measured valve member position and the input indicative of flow demanded; and
directing a second EHSV, using the controller, to change the VDM position and thereby actuate the VDP according to the measured VDM position and the input indicative of flow demanded.

9. The method as recited in claim 8, further comprising controlling the BPV to either:
recirculate flow from the outlet line to an inlet line of the VDP at a constant base recirculation rate when flow demanded by the downstream system is at or above a predetermined low threshold of flow through the VDP; or
recirculate flow from the outlet line to the inlet line of the VDP at an increased rate when flow demanded by the downstream system is below the predetermined low threshold of flow through the VDP.

10. The method as recited in claim 9, wherein the base recirculation rate is zero recirculation flow.

11. The method as recited in claim 9, further comprising receiving sensor data from a pressure sensor in the outlet line, wherein controlling the BPV to recirculate flow includes controlling the BPV based at least in part on the sensor data.

12. The method as recited in claim 9, wherein controlling the BPV to recirculate flow includes governing the bypass flow through the BPV according to $$BF=PF-DSFD$$

wherein BF is flow through the BPF, PF is flow through the VDP, and DSFD is flow demanded by the downstream system supplied by the outlet line.

13. The method as recited in claim 8, wherein when the input indicative of flow demanded is less than a predetermined low threshold of flow, the first EHSV changes the valve member position and thereby actuates the BPV such that a bypass flow is increased.

14. The method as recited in claim 13, wherein when the input indicative of flow demanded is equal to or above the predetermined low threshold of flow, the first EHSV changes the valve member position and thereby actuates the BPV such that the bypass flow is a constant base circulation rate.

15. The method as recited in claim 14, wherein the constant base recirculation rate is zero bypass flow.

16. The method as recited in claim 13, wherein the predetermined low threshold of flow is a threshold below which the VDP cannot self-lubricate.

* * * * *